United States Patent [19]

Ramsauer

[11] 4,095,615

[45] Jun. 20, 1978

[54] CHECK VALVE AND SIPHON TUBE ASSEMBLY EMPLOYING SAME

[75] Inventor: Larry R. Ramsauer, San Jose, Calif.

[73] Assignee: Ramco Manufacturing, Inc., San Jose, Calif.

[21] Appl. No.: 688,837

[22] Filed: May 21, 1976

[51] Int. Cl.² .................. F16K 15/03; F04F 10/00
[52] U.S. Cl. ................... 137/527.8; 137/140; 137/146; 137/151; 137/527
[58] Field of Search ............ 137/140, 146, 151, 521, 137/527, 527.2, 527.4, 527.6, 527.8

[56] References Cited

U.S. PATENT DOCUMENTS

| 364,206 | 6/1887 | Baltzley | 137/527.8 |
|---|---|---|---|
| 385,292 | 6/1888 | Baltzley | 137/527.8 X |
| 474,843 | 5/1892 | Mahan | 137/527.8 X |
| 1,000,719 | 8/1911 | Cram | 137/527.8 X |
| 1,187,683 | 6/1916 | Vernon | 137/527 |
| 1,926,759 | 9/1933 | Wallman | 137/527.8 X |
| 2,913,001 | 11/1959 | Maslow et al. | 137/527.4 |
| 3,682,193 | 8/1972 | Newsteder | 137/151 |
| 3,771,544 | 11/1973 | Horvath | 137/151 |
| 4,034,780 | 7/1977 | Horvath | 137/151 X |
| 4,035,299 | 7/1977 | Vroeginday | 137/142 X |

FOREIGN PATENT DOCUMENTS

| 851,293 | 10/1952 | Germany | 137/527.8 |
|---|---|---|---|
| 2,206,137 | 12/1971 | Germany | 137/527 |

*Primary Examiner*—Alan Cohan
*Assistant Examiner*—Gerald A. Michalsky
*Attorney, Agent, or Firm*—Boone, Schatzel, Hamrick & Knudsen

[57] ABSTRACT

A check valve for substantially preventing fluid flow in a first direction, but allowing a substantially unrestricted fluid flow in a second, opposite direction, the check valve including a tubular body and a flapper valve hingedly disposed within the tubular body so that the flapper valve, which is formed from a diagonally-cut section of tubing, may substantially block the tube by sealing its cut edges against a first inner wall portion of the tubular body and so that its cut edges may also lie substantially flush along a second inner wall portion of the tubular body allowing for substantially unimpeded fluid flow.

5 Claims, 13 Drawing Figures

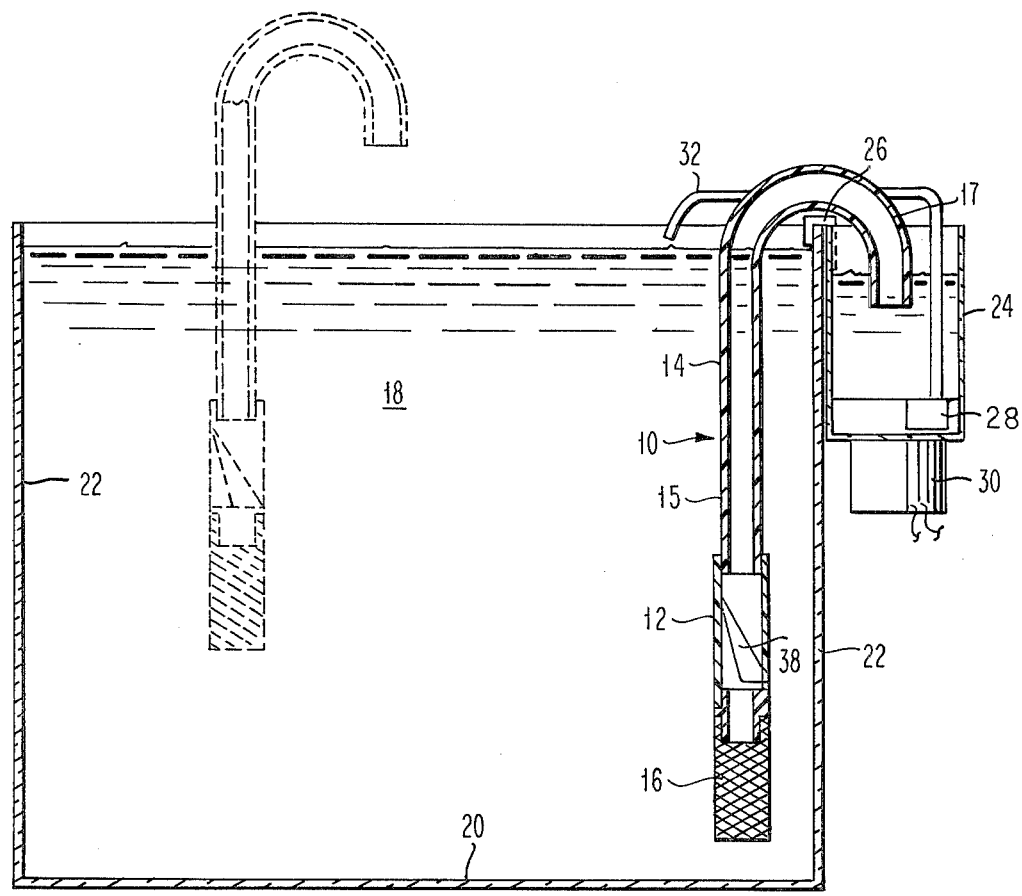
Fig_1
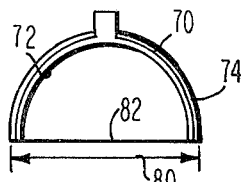
Fig_4
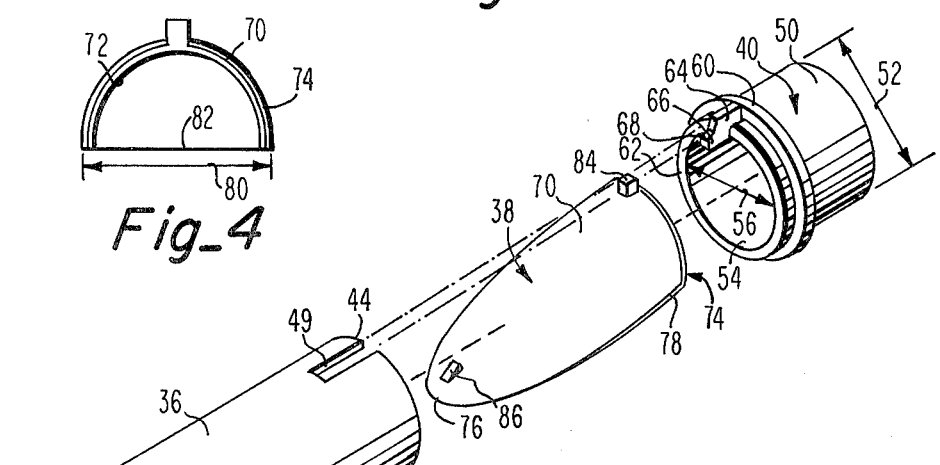
Fig_2
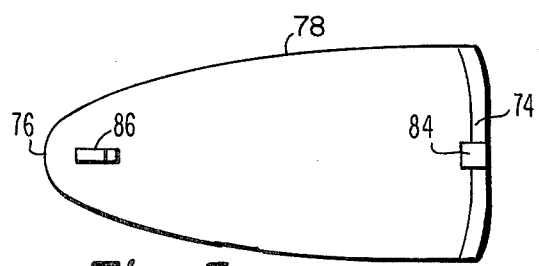
Fig_5

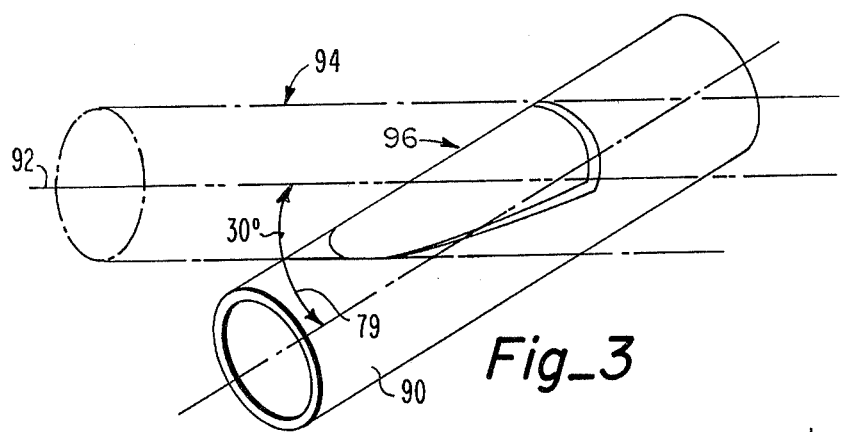
Fig_3
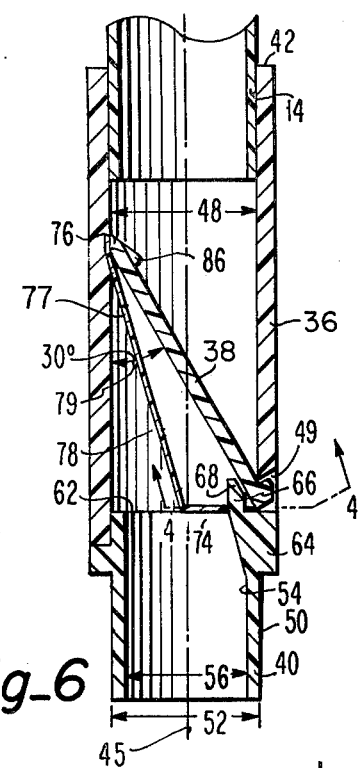
Fig_6
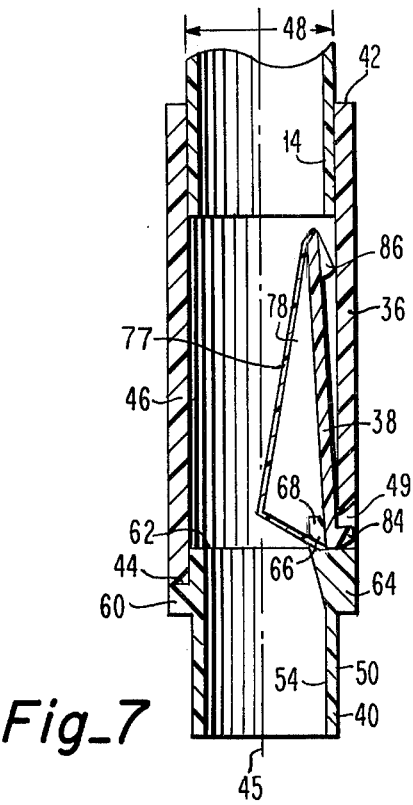
Fig_7
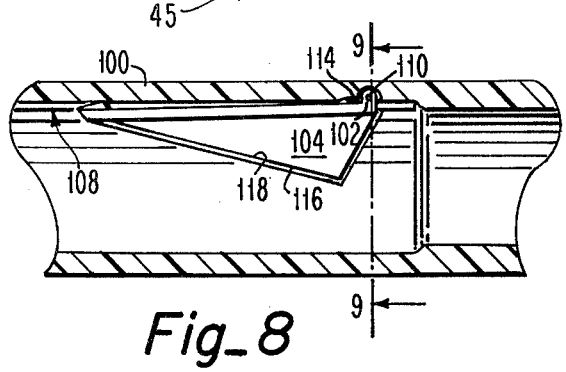
Fig_8
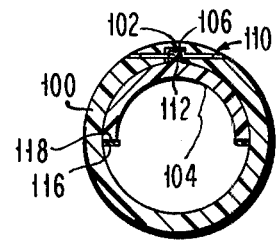
Fig_9

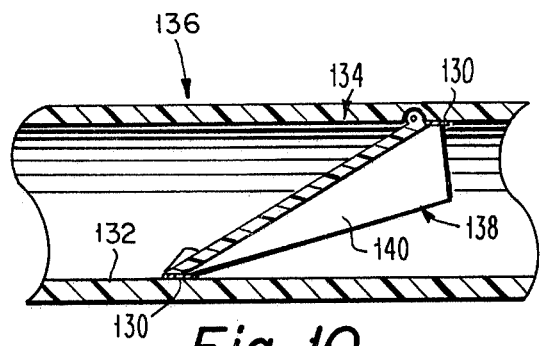
Fig_10
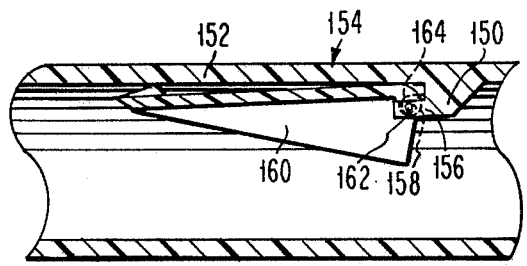
Fig_11
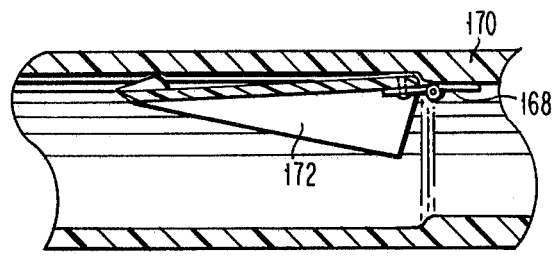
Fig_12
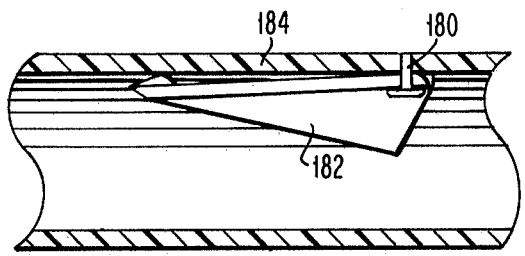
Fig_13

CHECK VALVE AND SIPHON TUBE ASSEMBLY EMPLOYING SAME

BACKGROUND OF THE INVENTION

1. Field of the Invention

The present invention relates generally to a check valve and an aquarium siphon employing same, and more particularly, to such a check valve that includes a flapper valve having a unique geometry that allows it to conform to a tubular body when the valve is in an open position and which is configured to form a seal with the body when the valve is in the closed position.

2. Description of the Prior Art

A check valve is a device included between sections of conduit through which fluid flows which enables the fluid to flow in one direction while restricting or preventing its flow in an opposite direction. Such valves are commonly used in many types of plumbing and pneumatic systems for restricting fluid flow in a preselected direction. Although check valves of virtually all shapes and sizes are available, in general the valves are relatively large with reference to the dimensions of the conduit and interfere to some degree with flow in the desired flow direction.

A particular application of a check valve is found in a siphon system for an aquarium tank. As disclosed in U.S. Pat. No. 3,771,544, entitled "Aquarium Siphons" by Tibor Horvath, a siphon tube assembly is employed in the aquarium tank and serves to remove water from the tank into a filter tank hung over the edge of the aquarium tank. In the siphon tube assembly a check valve is attached to the short end of a siphon tube for disposition in the filter tank. The check valve is a relatively complex structure that is expensive to manufacture and does not respond immediately to prevent fluid flow in a reverse direction.

SUMMARY OF THE INVENTION

It is therefore a primary object of the present invention to provide a simple, compact check valve that is light weight, substantially the same size as the tubes to which it is attached, relatively inexpensive to manufacture and which does not restrict fluid flow in one direction while substantially preventing fluid flow in a reverse direction.

Another object of the present invention is to provide a siphon tube assembly employing in combination a check valve of the type described that may be permanently mounted to the long end of the siphon tube that extends into the aquarium tank.

Briefly, the preferred embodiment of the present invention includes a tubular body having an axis therethrough and having a first end portion and an intermediate portion, the end portion having a first inner diameter and the intermediate portion including an inner surface having a second inner diameter that is slightly larger than the first inner diameter, a flapper valve formed from a portion of a tube having a third inner diameter that is equal to the first inner diameter, an outer diameter that is equal to the second inner diameter, and an outer surface that is symmetrical in plan view and is tapered between a second end and a third end, the valve being generally triangular in side view so as to form a periphery between and including the second end and the third end, the outer surface extending a dimension such that when the valve is disposed in the body the outer surface forms a predetermined angle in side view relative to the axis and the periphery contacts the inner surface, and a hinge connecting the outer surface at a location proximate the second end and the intermediate portion such that the valve is movable between an open and a closed position, whereby when the valve is in the open position the outer surface is adjacent the inner surface and the third inner diameter lies on an imaginary cylindrical surface corresponding to the first inner diameter such that fluid entering the end portion and flowing in a direction through the body is capable of substantially unrestricted flow, and whereby when the valve is in the closed position the outer surface in side view lies at the predetermined angle relative to the axis and the periphery generally contacts and forms a seal with the inner surface such that when fluid flow is in an opposite direction it moves the valve to the closed position which restricts fluid flow in the opposite direction.

In another embodiment the check valve is incorporated between a strainer and a siphon tube for use in an aquarium and serves to pump water from the aquarium to a separate filter tank.

Among the important advantages of the present invention are its simplicity, relatively low manufacturing cost, compact size, light weight, minimum number of components and its capability of allowing fluid to flow in only one direction.

Another advantage of the present invention is that it is capable of simply starting a siphon action in a siphon tube interconnecting an aquarium tank and a filter box hanging over an edge of the aquarium tank.

These and other objects and advantages of the present invention will no doubt become apparent following the reading of the detailed description of the preferred embodiments which are illustrated in the several figures of the drawing.

IN THE DRAWING

FIG. 1 is a vertical section through an aquarium tank and an attached filter tank, illustrating a siphon tube assembly including a check valve in accordance with the present invention and further illustrating in phantom view the operation of the check valve;

FIG. 2 is an exploded perspective view of the check valve of FIG. 1;

FIG. 3 illustrates a technique for forming a flapper valve;

FIG. 4 is an end view of the flapper valve taken through the lines 4—4 of FIG. 6;

FIG. 5 is a top plan view of the flapper valve;

FIGS. 6 and 7 are axial sections of the check valve illustrating the valve in the closed and in the open position, respectively;

FIG. 8 is an axial section of an alternative embodiment of the present invention;

FIG. 9 is a section through the lines 9—9 of FIG. 8;

FIG. 10 is an axial section of another alternative embodiment of the check valve in which an elastomeric material is provided on the inner surface of the body; and FIGS. 11-13 are axial sections of still other embodiments of the check valve in accordance with the present invention.

DETAILED DESCRIPTION OF THE PREFERRED EMBODIMENTS

Referring now to FIG. 1 of the drawing, a siphon tube assembly 10 employing a check valve 12 for permitting the unrestricted flow of fluid in one direction while substantially preventing fluid flow in an opposite direction in accordance with the present invention is illustrated in a section view. The siphon tube assembly 10 further includes a siphon tube 14 and a strainer 16. The siphon tube 14 has an inverted J-like shape and includes a long leg 15 for disposition in an aquarium tank 18 and a short leg 17 for disposition in a filter tank 24.

The aquarium tank 18 is a box-like enclosure including a bottom wall 20 and side walls 22 so as to be capable of holding water or the like. The filter tank 24 includes a wall having a top portion 26 in the shape of a hook that is hung over one of the walls 22 of the aquarium tank. Typically, such a filter tank includes a perforated base plate on which rests two main layers of filter material (not shown), a pump 28 driven by a motor 30 draws water from below the bottom wall of the filter tank and pumps it through a return tube 32 into the aquarium tank 18. The pump 28 lowers the water level in the filter tank 24 at a rate substantially equal to that at which the siphon tube assembly 10 is filling it with water from the aquarium tank 18.

In the siphon tube assembly 10, an end of the check valve 12 is connected to the lower portion of the long leg 15 of the siphon tube 14 and the strainer 16 is connected to the opposed end of the check valve. The strainer 16 serves to prevent small tropical fish specimens and the like from being drawn through the check valve and the siphon tube to the filter tank. The siphon tube 14 and the strainer 16 are of the type which are commercially available in aquarium accessory stores.

Turning also to FIGS. 2–5, the check valve 12 is illustrated in perspective, end and plan views. As shown, the check valve 12 comprises a body 36, a flapper valve 38, and a retaining member 40.

The body 36 is a tubular member including end walls 42 and 44 perpendicular to an axis 45 and an inner surface 46 having a diameter 48 that allows the body 36 to frictionally engage the siphon tube 14. A slot 49 extends inwardly from the end 44.

The retaining member 40 has a generally tubular shape and includes an outer surface 50 having an outer diameter 52 that serves to frictionally engage the siphon strainer 16 (shown in FIG. 1), an inner surface 54 having a diameter 56 that is less than the diameter 48. A collar 60 having a generally annular shape is formed around the outer surface 50 proximate the end 62. A key 64 extends from the collar 60 and includes a protruding portion 66 extending beyond the end 62 and having a distal surface 68 inclined at an angle of about 30° relative to the axis 45.

The flapper valve 38 is comprised of a portion of a tube (see FIG. 4) and has an outer surface 70, an inner surface 72, ends 74 and 76, and a periphery 78 between and including the ends 74 and 76. The outer surface lies on a cylinder having a diameter 80 that is substantially equal to the diameter 48. The inner surface 72 has a diameter 82 substantially equal to the diameter 56. The flapper valve 38 is illustrated in an end view in FIG. 4 and can be seen to appear as a tube section. With reference to FIG. 5, the flapper valve resembles a tapered section of a tube in top plan view with its periphery 78 having a generally parabolic shape between ends 74 and 76 and a generally straight line shape at end 74. A slot engaging member 84 extends outwardly from the central portion of the outer surface 70 at a location proximate the end 74 and a stand-off member 86 extends outwardly from the outer surface 70 proximate the end 76. The stand-off member 86 has a length about equal to the thickness of the wall of the flapper valve 38 and serves to maintain the flapper valve 38 away from the body when the valve is in the open position in a manner which will be described in detail subsequently. Turning now to FIGS. 2 and 6, the flapper valve 38 in side view has a generally triangular shape with its periphery 78 and outer surface 70 forming the sides of the triangle. As shown the angle 79 between the inner body surface 46 (or the axis 45) and the outer surface 70 is 30°.

In the preferred embodiment the body, the flapper valve and the retaining member are formed from a plastic material.

The geometry of the flapper valve 38 can be more clearly defined with reference to the method of its generation such as by a milling machine as illustrated in FIG. 3. As shown, a tube 90 is canted at an angle 79 of about 30° relative to the tubular axis 92 of a tubularly-shaped cutter 94 of a milling machine having a cutting diameter equal to the diameter of the tube. As the cutter is moved downwardly through the tube, it creates the flapper valve, illustrated by the numeral 96 in FIG. 3, after the flapper valve is trimmed from the remaining portion of the tube 90.

In order to assemble the check valve, the flapper valve 38 is inserted into the body 36 with the member 84 disposed in the slot 49. Then the retaining member 40 is inserted over the end 44 with the key 64 disposed proximate the member 84 into the slot 49 and with the collar 60 abutting the end 44. A solvent is placed on the juxtaposed portions of the retaining member and the body so as to bond the elements into an integral structure.

As assembled, the member 84 is hingedly movable within the slot 49 such that the flapper valve is movable between an open position (see FIG. 7) and a closed position (see FIG. 6). In the open position the outer surface 70 is generally adjacent the inner surface 46 and the inner surface 72 lies on an imaginary cylindrical surface generally corresponding to the inner diameter 56 of the retaining member 40. It should be noted that the stand-off member 86 maintains the flapper valve 38 away from the inner surface 46. Hence, the surface 70 does not exactly contact the inner surface 46 along its entire length. Because the thickness of the member 86 is equal to or less than the thickness of the wall of the flapper valve, the effective bore of the body still has a diameter equal to or greater than the bore of the retaining member. Thus, in the open position, fluid entering the inner diameter 56 of the member 40 and flowing in a direction through the body 36 is capable of substantially unrestricted flow. However, when the flapper valve 38 is in the closed position its outer surface 70 extends a dimension such that the outer surface 70 in axial section (or side) view lies at the 30° angle relative to the axis 45 and the periphery 78 contacts and forms a seal with the inner surface 46. Accordingly, when the fluid flows through the body 36 toward the member 40 it strikes the end 76 which is slightly spaced from the inner surface 46 by stand-off 86. This pressure and hence force against the outer surface 70 associated with the fluid striking the end 76 is sufficient to overcome the surface tension of the water and serves to move the flapper valve 38 to the closed position. This restricts fluid flow in the opposite direction.

As an optional feature comprising an alternate embodiment of the present invention an elastomeric substance 77 may be formed on the periphery 78 of the flapper valve, as shown in FIGS. 6 and 7. The elastomeric substance serves to further insure a fluid impervious seal between the flapper valve and the inner surface of body 36. An elastomeric substance may also be formed on the inner surface of body 36 along the area normally contacted by the flapper valve to further insure a fluid impervious seal.

The operation of the siphon tube assembly will now be described with reference again to FIG. 1. As shown, with the assembly 10 resting over the wall 22 the flapper valve is normally closed. However, by moving the siphon tube assembly 10 between its normal position and a raised position (illustrated in phantom in FIG. 1), the flapper valve 38 is moved to a closed position which causes the water in the siphon tube to remain in the tube such that the water level in the siphon tube is raised above the level of the water in the aquarium tank. Rapid movement of the siphon tube assembly between such normal and raised positions about three or four times and immediate placement of the siphon tube assembly 10 over the wall 22 with its short leg 17 in the filter tank 24 flushes the air from the siphon tube by pumping water up and over the curved portion of the tube 14. This starts the siphon action since with the air flushed from the short leg 17 and such short leg being disposed with its outlet below the water level of the aquarium tank a normal siphon action will result and the check valve will remain in the open position illustrated in FIG. 7.

An alternative embodiment of the present invention is illustrated in FIGS. 8 and 9. The fundamental difference in the embodiment illustrated in FIGS. 8 and 9 and that illustrated in FIGS. 1-7 is that the body 100 is integral with the retaining member and the hinge is between a protruding portion 102 of the flapper valve 104 and a groove 106 formed in the inner surface 108 of the body. A pin 110 extends through an opening 112 in the portion 102 and serves to hingedly mount the flapper valve 104 to the body 100. A spring 114 such as a hair spring is wound around the pin 110 to prevent its removal from the opening and also to bias the flapper valve 104 toward the closed position. Accordingly, the spring 114 serves to load the valve 104 such that in a zero flow condition, the valve is in the closed position. This prevents fluid flow in the reverse direction. By selectively choosing the spring constant of the spring the valve can be capable of opening in very low pressure environments.

In addition, an elastomeric material 116 is formed on the periphery 118 so that when the flapper valve is in the closed position a fluid-tight seal is formed.

Still another embodiment is illustrated in FIG. 10 wherein an elastomeric material 130 is formed on the inner surface 132 of the central portion 134 of the body 136 at locations where the body is contacted by the outer periphery 138 of the flapper valve 140.

Referring now to FIGS. 11-13, axial sections are illustrated of still other embodiments of the present invention. Each of the embodiments includes a different hinge structure for hingedly mounting the flapper valve to the body.

In FIG. 11 a member 150 depends from the wall 152 of the body 154 into the hollow interior portion and includes an opening 156. A pair of spaced apart mounting portions 158 having openings in alignment with the opening 156 protrude from the inner surface of the flapper valve 160. A pin 162 extends through the aligned openings and serves to hingedly mount the flapper valve to the body. A spring 164 serves to load the valve 160 such that in the zero flow condition the valve is in the closed position.

In FIG. 12, a hinge 168 welded to the inner surface of the body 170 and connected to the flapper valve 172 serves to hingedly connect the valve to the body.

With reference to FIG. 13, a fastener 180 extending through the flapper valve 182 and fastened to the body 184 as by welding, soldering, brazing, etc. serves to hingedly mount the flapper valve to the body.

Although not shown, it should be recognized that other sealing configurations are available and other hinged structures can be used to mount the flapper valve to the body. Furthermore, check valves of the present invention can be used in aerospace, plumbing, hydraulic pneumatic, etc., applications. In addition, the angle between the periphery and the outer surface of the flapper valve may vary between 10° and 80°. In embodiments where the angle is small the valve is able to close quicker since the angle that the valve is required to swing through is relatively small.

From the above, it will be seen that there has been provided a check valve and a siphon tube assembly including such a check valve which fulfills all of the objects and advantages set forth above.

While the invention has been particularly shown and described with reference to certain preferred embodiments, it will be understood by those skilled in the art that various alterations and modifications in form and detail may be made therein without departing from the invention. Accordingly, it is intended that the following claims cover all such alterations and modifications as fall within the true spirit and scope of the invention.

What is claimed is:

1. A check valve comprising:
    a generally tubular retaining member having a first end, a first inner diameter, a collar formed proximate said first end and a key extending from said collar to a location beyond said first end;
    a generally tubular body having an axis therethrough and including an inner surface having a second inner diameter that is slightly larger than said first inner diameter, said body further having a second end and a slot extending from said second end, said slot serving to receive said key when said collar abuts said second end; and
    a flapper valve formed from a portion of a tube having a third inner diameter that is substantially equal to said first inner diameter and having an outer diameter that is substantially equal to said second inner diameter, said valve having an outer surface that is symmetrical in plan view and is tapered between a first end and a second end, said valve further being generally triangular in side view so as to form a periphery between and including said first end and said second end, said outer surface extending a dimension such that when said valve is disposed in said body said outer surface forms a predetermined angle in side view relative to said axis and said periphery contacts said inner surface, said valve further including a slot-engaging member hingedly disposed in said slot adjacent said key such that said valve is movable between an open and a closed position, whereby when said valve is in said open position said outer surface is adjacent said inner surface and said third inner diameter lies on an imaginary cylindrical surface substantially corresponding to said first inner diameter such that fluid entering said retaining member and flowing in a direction through said body is capable of substantially unrestricted flow, and whereby when said valve is in said closed position said outer surface in side view lies at said predetermined angle relative to said axis and said periphery contacts and forms a seal with said inner surface such that when fluid flow is in an opposite direction it moves said valve to said closed position which substantially restricts fluid flow in said opposite direction.

2. A check valve as recited in claim 1 wherein said flapper valve further includes a stand-off member extending outwardly from said outer surface, said stand-off member serving to maintain said outer surface slightly spaced from said inner surface when said valve is in said open position, whereby when fluid flows in said opposite direction a portion of such fluid flows between said inner and outer surfaces and forces said valve into said closed position.

3. A check valve as recited in claim 1 and further comprising means formed of an elastomeric material disposed between said periphery and said inner surface when said valve is in said closed position for improving the seal.

4. A check valve as recited in claim 3 wherein said means formed of an elastomeric material is disposed on said periphery.

5. A check valve as recited in claim 3 wherein said means formed of an elastomeric material is disposed on said inner surface of said body.

* * * * *